(12) United States Patent
Oppenheim et al.

(10) Patent No.: US 8,882,887 B2
(45) Date of Patent: Nov. 11, 2014

(54) PROCESS STREAM DESULFURIZATION

(75) Inventors: Judith Pauline Oppenheim, Friendswood, TX (US); George Frederick Frey, Houston, TX (US); Jennifer Lucia Ramirez, Houston, TX (US); Hsien-Chin William Yen, Sugar Land, TX (US)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 13/598,276

(22) Filed: Aug. 29, 2012

(65) Prior Publication Data
US 2014/0060325 A1 Mar. 6, 2014

(51) Int. Cl.
*B01D 53/02* (2006.01)
(52) U.S. Cl.
USPC .............. 95/92; 95/135; 95/136; 95/137
(58) Field of Classification Search
USPC .............................. 95/92, 135–137
See application file for complete search history.

(56) References Cited

U.S. PATENT DOCUMENTS

| 2,359,660 | A | * | 10/1944 | Martin et al. | 95/124 |
| 2,603,553 | A | * | 7/1952 | Berg | 423/229 |
| 3,598,521 | A | * | 8/1971 | Alley | 423/224 |
| 4,909,926 | A | | 3/1990 | Yan | |
| 5,034,118 | A | | 7/1991 | Bricker et al. | |
| 5,037,552 | A | | 8/1991 | Furuta et al. | |
| 5,114,689 | A | | 5/1992 | Nagji et al. | |
| 7,517,389 | B2 | * | 4/2009 | Van De Graaf et al. | 95/135 |
| 2010/0111784 | A1 | | 5/2010 | Mak et al. | |

FOREIGN PATENT DOCUMENTS

EP 0451715 A1 10/1991

* cited by examiner

*Primary Examiner* — Christopher P Jones
(74) *Attorney, Agent, or Firm* — Sutherland Asbill & Brennan LLP

(57) ABSTRACT

A method of reducing the concentration of at least one sulfur compound in a process stream and for recovering at least one sulfur compound from a process stream are provided. A process stream is delivered to a vessel, wherein the vessel comprises an adsorbent material. At least one solvent is transferred into the vessel. One or more fluids are then removed from the vessel. At least one of the fluids removed from the vessel comprises a clean gas. The adsorbent material may be regenerated to yield a high concentration of the at least one sulfur compound.

16 Claims, 3 Drawing Sheets

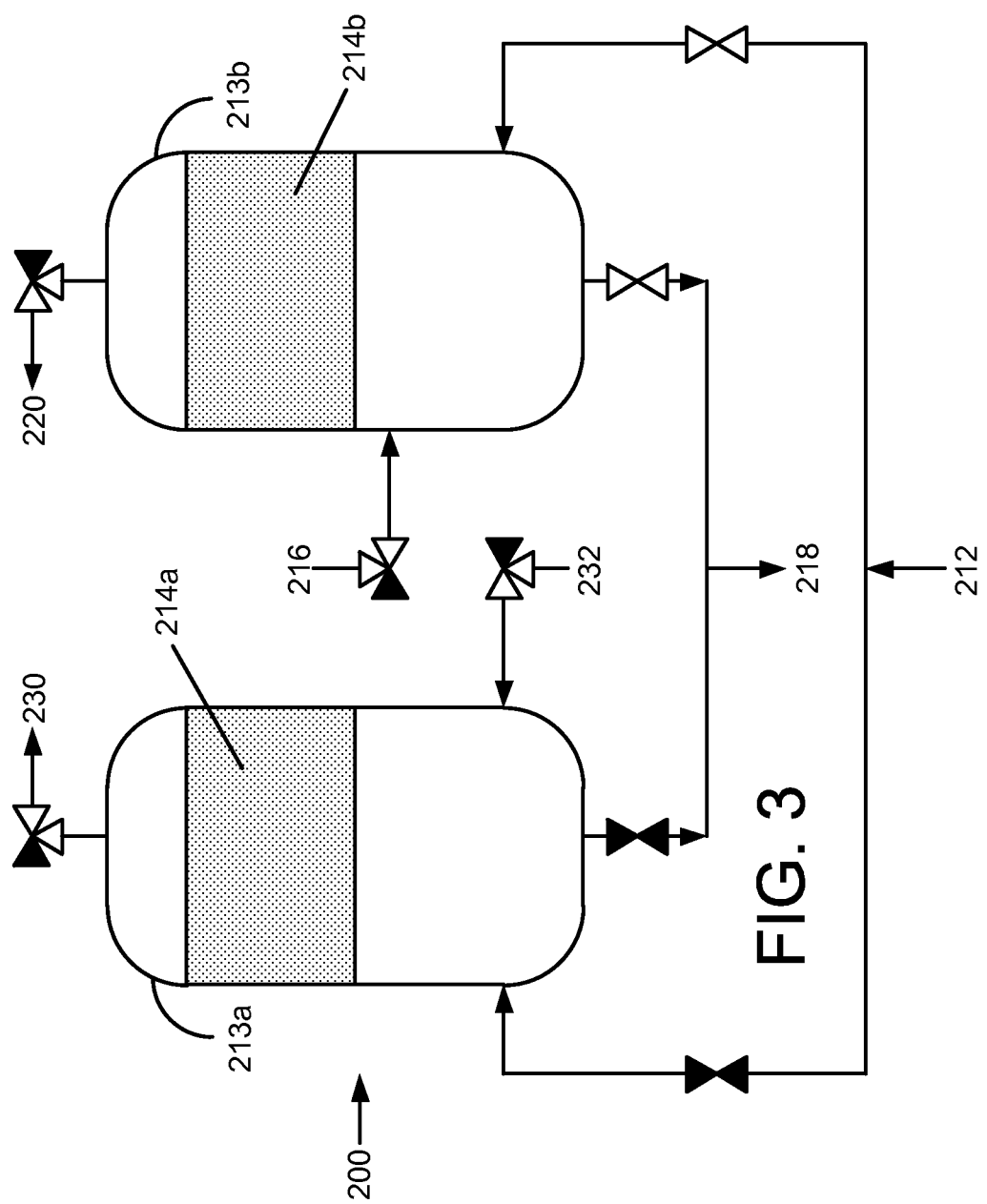

PROCESS STREAM DESULFURIZATION

BACKGROUND OF THE INVENTION

The subject matter of the present disclosure generally relates to the removal and recovery of sulfur compounds from a process stream.

In various applications, the removal of sulfur compounds from hydrocarbon process streams is desirable, depending in part upon the intended use of the final sweetened hydrocarbon products. The presence of sulfur compounds in hydrocarbon fuels is objectionable because of corrosion problems and air pollution resulting from the combustion of the sour hydrocarbons. Additionally, it is desirable to efficiently recover sulfur compounds that are removed from hydrocarbons.

Accordingly, there exists a need for improved methods for removing and recovering sulfur compounds from hydrocarbons.

BRIEF DESCRIPTION OF THE INVENTION

In one aspect, a method of reducing the concentration of at least one sulfur compound in a process stream is provided. A process stream is delivered to a vessel, wherein the vessel comprises an adsorbent material. At least one solvent is transferred into the vessel. One or more fluids are then removed from the vessel. At least one of the fluids removed from the vessel comprises a clean gas.

In another aspect, a method for recovering at least one sulfur compound from a process stream is provided. A process stream is delivered to a vessel, wherein the vessel comprises an adsorbent material. At least one solvent is transferred into the vessel. One or more fluids are then removed from the vessel. The adsorbent material is then regenerated, wherein a high concentration of the at least one sulfur compound is desorbed form the adsorbent material.

In a further aspect, a method for reducing the concentration of sulfur and recovering sulfur compounds from process streams is provided. A first vessel and a second vessel are provided, with each vessel comprising an adsorbent material. A process stream is delivered into the first vessel, where the first vessel includes an unsaturated adsorbent material. At least one solvent is transferred into the first vessel. One or more fluids are removed from the first vessel, wherein at least one of the fluids removed from the first vessel comprises a clean gas. The adsorbent material of the second vessel is regenerated, where the second vessel comprises a saturated adsorbent material, and where a high concentration of at least one sulfur compound is desorbed from the saturated adsorbent material.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein:

FIG. 3 illustrates a system for the adsorption of at least one sulfur compound from a process stream by an unsaturated adsorbent material and recovering at least one sulfur compound from a saturated adsorbent material in accordance with an embodiment of the present disclosure.

DETAILED DESCRIPTION OF THE INVENTION

Figure 1:
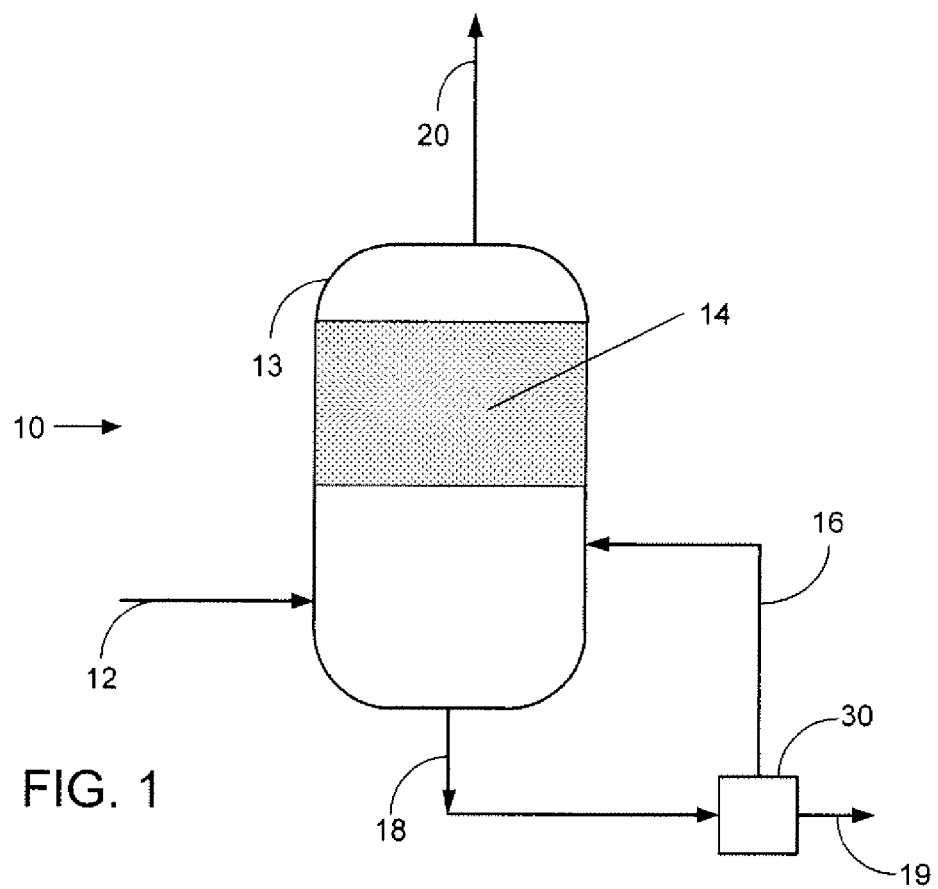
FIG. 1 illustrates a system for adsorption of at least one sulfur compound from a process stream by an adsorbent material in accordance with an embodiment of the present disclosure.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Desulfurization of a Process Stream

Disclosed is a method for removing one or more sulfur compounds from a process stream. The process stream includes but is not limited to reservoir produced gas, syngas, and/or a refinery or chemical plant stream. A column comprising an adsorbent bed may be fed with a "sour" hydrocarbon stream. The hydrocarbon stream is "sweetened" on passing through the adsorbent bed and additional "sour" hydrocarbons are washed from the column using a solvent stream. The adsorbent column produces a clean overhead hydrocarbon stream and a sulfur-saturated solvent stream. The sulfur-saturated solvent stream may be removed from the bottom of the column. The packed bed of adsorbent is specific for removal of sulfur-containing compounds and may be located above or below the feed point of the solvent stream. Since both the adsorbent bed and the solvent stream remove sulfur from the process stream, this process delivers a "sweetened" hydrocarbon stream that may comprise ultra-low concentrations of sulfur-containing compounds.

At the bottom of the column, the sulfur-saturated solvent stream is transferred to process equipment, as is standard in the art, that may reduce pressure or increase temperature or both, such that the solvent regains its capacity to dissolve sulfur compounds. A pump may recycle the solvent back to the top of the column. Since the adsorbent bed captures any sulfur compounds that are not absorbed by the solvent, the observed scrubbing rates of the solvent alone are lower than they would be without the adsorbent bed.

Once the adsorbent bed reaches capacity, sulfur compounds may begin to leak into the clean overhead hydrocarbon stream. Various control processes, commonly known to those of skill in the art, may be used to prevent the overhead hydrocarbon stream from exceeding an upper limit for concentrations of sulfur compounds in the hydrocarbon stream. For instance, the flow rate of the solvent may be increased, the temperature of the solvent may be decreased, or the solvent may be changed. One or more of the control processes may be used until there is an opportunity to replace the adsorbent bed. Or, the process stream may be diverted to second column containing a fresh packed adsorbent bed.

According to embodiments of the present disclosure an apparatus 10 and method of reducing the concentration of at least one sulfur compound in a process stream 12 are provided. In some embodiments, the process stream 12 may comprise a syngas. In some embodiments, the process stream 12 may comprise a reservoir production gas, a refinery stream, and/or a chemical plant stream. In some embodiments, the process stream 12 may have a sulfur content of about 50 ppm to about 5000 ppm, about 50 ppm to about 2500 ppm, about 50 ppm to about 2000 ppm, about 50 ppm to about 1000 ppm, about 50 ppm to about 500 ppm, about 50 ppm to about 100 ppm, or about 50 ppm.

The process stream 12 may include one or more sulfur compounds, including but not limited to hydrogen sulfide, carbonyl sulfide, alkyl mercaptans, thioethers, tetrahydro thiophene, other organic sulfur compounds, and combinations thereof.

The apparatus 10 is shown in FIG. 1. The process stream 12 may be introduced into a vessel 13 that includes an adsorbent material 14. At least one solvent 16 may then be transferred into the vessel 13 that contains the adsorbent material 14. Both the process stream 12 and the at least one solvent 16 may then diffuse through the adsorbent material 14. In some embodiments, the process stream 12 and the at least one solvent 16 diffuse through the adsorbent material with a countercurrent flow. During the diffusion of the process stream 12 and the at least one solvent 16 through the adsorbent material 14, at least one sulfur compound from the process stream 12 is adsorbed by the adsorbent material 14. One or more fluids may be removed from the vessel 13 that contains the adsorbent material 14. In some embodiments, at least one of the fluids removed from the vessel comprises a clean gas 20.

In some embodiments, the at least one solvent 16 may comprise a hydrocarbon solvent. In some embodiments, the at least one solvent 16 includes but is not limited to ethylene glycol, diethylene glycol, triethylene glycol, methanol, a mixture of dimethyl esters of polyethylene glycols (DEPG), lean oil, ethane, propane, butane, and combinations thereof.

In some embodiments, the clean gas 20 may comprise a total concentration of sulfur compounds that is less than about 10 ppm by volume. In some embodiments, the clean gas 20 may comprise a total concentration of sulfur compounds that is less than about 5 ppm by volume. In some embodiments, the clean gas 20 may comprise a total concentration of sulfur compounds that is less than about 1 ppm by volume. In some embodiments, the clean gas 20 may comprise a total concentration of sulfur compounds that is less than about 0.5 ppm by volume. In some embodiments, the clean gas 20 may comprise a total concentration of sulfur compounds that is less than about 0.1 ppm by volume.

In some embodiments, the process stream 12 may comprise one or more fluids. In some embodiments, the process stream 12 may comprise one or more hydrocarbons. In some embodiments, the hydrocarbons may include, but are not limited to methane, ethane, propane, butane, pentanes, and combinations thereof. In some embodiments, the process stream 12 may further comprise one or more contaminants, including but not limited to carbon dioxide, oxygen, nitrogen, argon, water, steam, and combinations thereof.

In some embodiments, the process stream 12 may be in contact with the adsorbent material 14 for a time in the range from about 1 min. to about 60 min., from about 1 min. to about 30 min, about 1 min. to about 10 min., about 1 min. to about 5 min., or about 5 min. to about 10 min. In some embodiments, the sulfur content of the clean gas 20 may be monitored to determine when the adsorbent material 14 may be unable to adsorb additional sulfur compounds. One of ordinary skill in the art would recognize the acceptable total concentration of sulfur compounds permissible in the clean gas 20.

In some embodiments, a cold water stream may be supplied to a thermal assembly surrounding the vessel 13. In some embodiments, the cold water stream may be at a temperature in the range of about 10° C. to about 25° C., 10° C. to about 20° C., or about 10° C. to about 15° C. The thermal assembly may be in thermal contact with the vessel 13 and, in some embodiments, with the adsorbent material 14. In some embodiments, the thermal assembly may form a jacket that partially or fully encompasses the adsorbent bed 14. In still other embodiments, the thermal assembly may comprise a series of coils that may partially or fully encompass the adsorbent material 14. In some embodiments, a hot water stream may be returned from the thermal assembly. In some embodiments, the hot water stream may be at a temperature in the range from about 40° C. to about 95° C., about 40° C. to about 85° C., about 40° C. to about 75° C., about 40° C. to about 65° C., or about 40° C. to about 50° C.

In some embodiments, the adsorbent material 14 may comprise any dry adsorbent material that is capable of physically adsorbing at least one sulfur compound. In some embodiments, the adsorbent material 14 may comprise a packed adsorbent bed. The adsorbent material 14 may include any adsorbent that does not chemically react with sulfur compounds. In some embodiments, the adsorbent material 14 may comprise one or more adsorbents, including but not limited to nickel, nickel compounds, copper zeolites, cupric chloride on alumina, palladium chloride on alumina, and combinations thereof.

In some embodiments, the one or more fluids that are removed from the vessel 13 and may include one or more sulfur-saturated solvents 18. Without being bound by any single theory, the solvent does not take up adsorbent capacity. In the case where solvent diffuses through the adsorbent, the bed may adsorb sulfur left behind from the solvent regeneration step. In some embodiments, the sulfur-saturated solvents 18 are discharged using at least one outlet that is fluidly connected to the vessel 13.

In some embodiments, the one or more sulfur-saturated solvents 18 are delivered to a solvent recovery system 30. The solvent recovery system 30, of common design to those of skill in the art, may be used to separate the at least one solvent 16 from any sulfur compounds that are absorbed by the one or more sulfur-saturated solvents 18. A second offgas 19 may be collected from the solvent recovery system 30 using methods known to those of ordinary skill in the art. In some embodiments, the second offgas 19 includes one or more sulfur compounds. The at least one solvent 16, after being processed through the solvent recovery system 30, may then be recycled back into the vessel 13 that contains the adsorbent material 14 as a low pressure, hot sweep gas during the regeneration step. In some embodiments, a solvent pump is used to transfer the at least one solvent 16 from the solvent recovery system 30 back into the vessel 13.

Method to Regenerate the Packed Bed and Recover Sulfur Compounds

Without being bound by any single theory, the regeneration of a physical adsorbent such as a zeolite generally requires high temperatures to release adsorbed compounds. In contrast, in the adsorption mode, the maximum sulfur compound loading capacity is obtained at lower temperatures.

A method for recovering at least one sulfur compound from a process stream 12 is also provided. The method includes delivering a process stream 12 to vessel 13, wherein the vessel 13 includes an adsorbent material 14. At least one solvent 16 is transferred into the vessel, and one or more fluids are then removed from the vessel 13. The adsorbent material 14 is then regenerated and a high concentration of at least one sulfur compound is desorbed from the adsorbent material 14.

Figure 2:
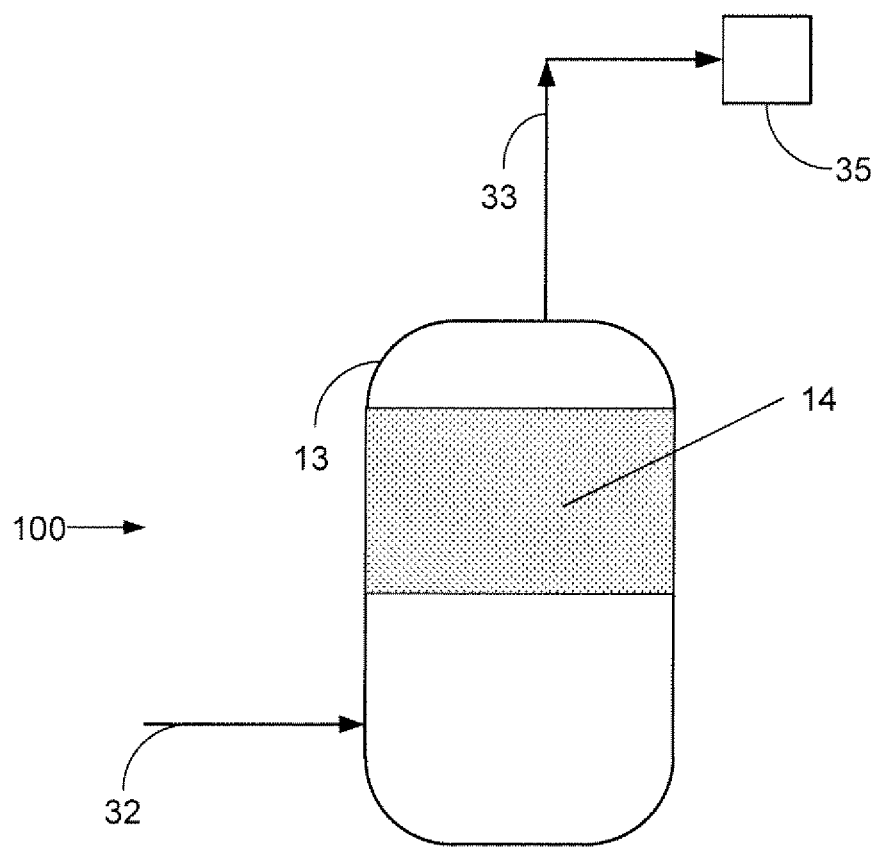
FIG. 2 illustrates a system for the recovery of at least one sulfur compound from an adsorbent material in accordance with an embodiment of the present disclosure.

Turning to FIG. 2, an apparatus 100 and a method for regenerating the adsorbent material 14 is illustrated. A heated inert gas 32 is passed through the vessel 13 that includes the packed bed 14. In some embodiments, the inert gas is a dry gas, with a moisture content of less than about 100 ppm, about 50 ppm, about 10 ppm, about 1 ppm, or about 0.1 ppm. In some embodiments, the inert gas may comprise nitrogen, argon, or combinations thereof. In some embodiments, the heated inert gas 32 is delivered to the vessel 13 at a low pressure.

In some embodiments, the heated inert gas 32 is at a temperature in the range of about 50° C. to about 300° C., about 50° C. to about 260° C., about 100° C. to about 250° C., about 150° C. to about 250° C., or about 200° C. In some embodiments, a stream of hot water may also be supplied to the thermal assembly surrounding vessel 13. The thermal assembly may be in thermal contact with the adsorbent material 14. In some embodiments, the stream of hot water may be at a temperature in the range of about 40° C. to about 90° C., about 40° C. to about 80° C., about 40° C. to about 70° C., about 40° C. to about 60° C., or about 50° C. to about 60° C. The stream of hot water, after passing through the thermal assembly, emerges as a stream of warm water. The stream of warm water may then subsequently be re-heated to regenerate the stream of hot water.

In some embodiments, the vessel 13 including the adsorbent material 14 may be heated for a sufficient time and at a sufficient temperature to initiate the desorption of a high concentration of at least one sulfur compound 33 from the adsorbent material 14. The high concentration of at least one sulfur compound 33 may then be delivered to a sulfur recovery unit 35. In some embodiments, a sufficient heating time for the adsorbent material 14 to release the high concentration of at least one sulfur compound 30 is in the range of about 30 min. to about 24 hours, about 30 min. to about 360 min., about 30 min. to about 120 min., or about 30 min. to about 60 min. As would be known to those of ordinary skill in the art, heating of the adsorbent material 14 is not the only method to control sulfur desorption.

In some embodiments, a method for reducing the concentration of sulfur compounds in process streams and recovering these sulfur compounds is provided. A first vessel and a second vessel, each comprising an absorbent material, may be used. A process stream may be delivered to the first vessel, where the first vessel includes an unsaturated absorbent material. As used herein, the term "unsaturated" means that the absorbent material has not reached its capacity to absorb sulfur compounds. At least one solvent is then transferred into the first vessel. One or more fluids are then removed from the first vessel, and at least one of the fluids removed from the first vessel includes a clean gas. The second vessel, which includes a saturated adsorbent material, may be regenerated to desorb a high concentration of at least one sulfur compound from the saturated adsorbent material. As used herein, the term "saturated" means that the adsorbent material is at or near its capacity to adsorb sulfur compounds.

Turning now to FIG. 3, a coupled vessel design is shown. Exemplary embodiment 200 includes vessel 213a and vessel 213b. In this embodiment, vessel 213a is configured for regeneration. The adsorbent material 214b may be an unsaturated or partially saturated adsorbent material. A control system sets the isolation of valves to route a process stream 212 to vessel 213b. Similarly, the control system sets a 3-way valve to route at least one solvent 216 to vessel 213b. A clean gas 220 may then be removed from the vessel 213b. Additionally, one or more sulfur-saturated solvents 218 may be removed from vessel 213b.

In the described embodiment, vessel 213a is configured for regeneration. The adsorbent material 214a may be a saturated or partially-saturated adsorbent material. The control system sets a 3-way valve to route a heated inert gas 232 to vessel 213a to produce at least one sulfur compound 230.

As illustrated in FIG. 3, the control system may be used to set numerous isolation valves and 3-way valves such that vessel 213b may be switched to a regeneration configuration and vessel 213a may be switched to an adsorption/absorption configuration. This switching involves using the isolation valves and the 3-way valves to route the appropriate inputs and outputs, as described hereinabove, to the correct vessel.

There is no limitation that only two vessels are used; a system may comprise multiple vessels connected in series or parallel arrangements to allow for continual adsorption/absorption and regeneration using multiple vessels at the same time.

It should be apparent that the foregoing relates only to the preferred embodiments of the present invention and that numerous changes and modifications may be made herein without departing from the spirit and the scope of the invention as defined by the following claims and equivalents thereof.

We claim:

1. A method of reducing the concentration of at least one sulfur compound in a process stream comprising:
    delivering the process stream into a vessel, wherein the vessel comprises an adsorbent material;
    transferring at least one solvent into the vessel;
    diffusing the process stream and the at least one solvent through the absorbent material, wherein the at least one sulfur compound in the process stream is at least partially adsorbed by the adsorbent material and the at least one sulfur compound in the process stream is at least partially absorbed by the at least one solvent; and
    removing one or more fluids from the vessel;
    wherein at least one of the fluids removed from the vessel comprises a clean gas.

2. The method of claim 1, wherein the clean gas comprises a total concentration of sulfur compounds of less than about 5 ppm by volume.

3. The method of claim 1, wherein the clean gas comprises a total concentration of sulfur compounds of less than about 1 ppm by volume.

4. The method of claim 1, wherein the process stream and the at least one solvent are diffused through the adsorbent material by a countercurrent flow.

5. The method of claim 1, wherein the adsorbent material comprises a packed adsorbent bed.

6. The method of claim 1, wherein the one or more fluids comprises one or more sulfur-saturated solvents.

7. The method of claim 6, further comprising removing one or more sulfur compounds from the one or more sulfur-saturated solvents to regenerate the at least one solvent.

8. The method of claim 7, further comprising transferring the regenerated at least one solvent into the vessel.

9. The method of claim 1, wherein the process stream comprises a syngas.

10. A method of recovering at least one sulfur compound from a process stream comprising:
    delivering the process stream to a vessel, wherein the vessel comprises an adsorbent material;
    transferring at least one solvent into the vessel;
    diffusing the process stream and the at least one solvent through the absorbent material, wherein the at least one sulfur compound in the process stream is at least partially adsorbed by the adsorbent material and the at least one sulfur compound in the process stream is at least partially absorbed by the at least one solvent;
    removing one or more fluids from the vessel; and
    regenerating the adsorbent material, wherein a high concentration of the at least one sulfur compound is desorbed from the adsorbent material.

11. The method of claim 10, wherein the step of regenerating comprises flowing a heated inert gas through the vessel.

12. The method of claim 10, further comprising delivering the desorbed at least one sulfur compound to a sulfur recovery unit.

13. The method of claim 10, wherein the one or more fluids comprises one or more sulfur-saturated solvents.

14. The method of claim 13, further comprising isolating one or more sulfur compounds from the one or more sulfur-saturated solvents.

15. The method of claim 10, wherein the adsorbent material comprises a packed adsorbent bed.

16. A method for reducing the concentration of sulfur and recovering sulfur compounds from process streams comprising:
    providing a first and a second vessel, wherein each vessel comprises an adsorbent material;
    delivering a process stream comprising at least one sulfur compound into the first vessel, the first vessel comprising an unsaturated adsorbent material;
    transferring at least one solvent into the first vessel;
    diffusing the process stream and the at least one solvent through the unsaturated absorbent material, wherein the at least one sulfur compound in the process stream is at least partially adsorbed by the unsaturated adsorbent material and the at least one sulfur compound in the process stream is at least partially absorbed by the at least one solvent;
    removing one or more fluids from the first vessel, wherein at least one of the fluids removed from the first vessel comprises a clean gas; and
    regenerating the adsorbent material of the second vessel, the second vessel comprising a saturated adsorbent material, wherein a high concentration of at least one sulfur compound is desorbed from the saturated adsorbent material.

* * * * *

UNITED STATES PATENT AND TRADEMARK OFFICE
CERTIFICATE OF CORRECTION

PATENT NO. : 8,882,887 B2  Page 1 of 1
APPLICATION NO. : 13/598276
DATED : November 11, 2014
INVENTOR(S) : Judith Pauline Oppenheim et al.

It is certified that error appears in the above-identified patent and that said Letters Patent is hereby corrected as shown below:

In the Claims

In Column 6, line 47, replace "absorbent material" with --adsorbent material--.

In Column 7, line 14, replace "absorbent material" with --adsorbent material--.

In Column 8, line 16, replace "absorbent material" with --adsorbent material--.

Signed and Sealed this
Seventeenth Day of February, 2015

Michelle K. Lee
*Deputy Director of the United States Patent and Trademark Office*